United States Patent
Yoshimura et al.

(10) Patent No.: US 8,881,362 B2
(45) Date of Patent: Nov. 11, 2014

(54) STATOR MANUFACTURING METHOD AND STATOR

(71) Applicants: Joji Yoshimura, Toyota (JP); Koji Nakanishi, Konan (JP); Yasuhiro Ueno, Toyota (JP)

(72) Inventors: Joji Yoshimura, Toyota (JP); Koji Nakanishi, Konan (JP); Yasuhiro Ueno, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 13/673,651

(22) Filed: Nov. 9, 2012

(65) Prior Publication Data

US 2013/0062973 A1  Mar. 14, 2013

Related U.S. Application Data

(63) Continuation of application No. PCT/JP2010/059815, filed on Jun. 10, 2010.

(51) Int. Cl.
*H02K 15/02* (2006.01)
*H02K 15/12* (2006.01)
*H02K 1/18* (2006.01)

(52) U.S. Cl.
CPC ............... *H02K 15/02* (2013.01); *H02K 15/12* (2013.01); *H02K 1/185* (2013.01); *H02K 15/022* (2013.01)
USPC ................ 29/419.1; 310/43; 310/216.004

(58) Field of Classification Search
USPC .............. 310/43, 216.026, 216.024, 216.035, 310/216.008, 216.011, 216.067, 216.061, 310/216.097, 216.105, 216.109; 29/419.1, 29/527.1
See application file for complete search history.

(56) References Cited

U.S. PATENT DOCUMENTS

| | | | | |
|---|---|---|---|---|
| 4,219,748 | A | * | 8/1980 | Sakaguchi et al. ............... 310/71 |
| 2009/0302694 | A1 | * | 12/2009 | Asai ................................. 310/45 |

FOREIGN PATENT DOCUMENTS

| | | | |
|---|---|---|---|
| JP | 2002-144334 A | | 5/2002 |
| JP | 2007295740 A | * | 11/2006 |
| JP | 2007-295740 A | | 11/2007 |
| JP | 2008-160938 A | | 7/2008 |
| JP | 2008-178256 A | | 7/2008 |

(Continued)

OTHER PUBLICATIONS

JPO website machine translation of JP 2007295740 A into english, Takahashi et al, Stator core for an electric motor has core surrounding body that is formed out of an electromagnetic steel wire wound at a circumferential direction, and a thermosetting resin hardening body, all pages.*

(Continued)

*Primary Examiner* — Quyen Leung
*Assistant Examiner* — Naishadh Desai
(74) *Attorney, Agent, or Firm* — Kenyon & Kenyon LLP

(57) ABSTRACT

In a stator manufacturing method to manufacture a stator in which divided-core assemblies are arranged in a cylindrical shape, each of which includes a divided-core member having a teeth portion on which a coil is wound. In this method, the divided-core assemblies are inserted in the cylindrical shape into a fixed mold, resin sheets containing glass fibers or carbon fibers are disposed on coil-end portions of the cylindrically-arranged divided-core assemblies, and a slide part of a movable mold applies pressure to and molds the resin sheets, thereby combining the divided core assemblies into a single unit. The movable mold is operated to position the divided-core assemblies in place by a cylindrical part and then apply pressure to and mold the resin sheets by the slide part.

5 Claims, 17 Drawing Sheets

(56) References Cited

FOREIGN PATENT DOCUMENTS

| | | |
|---|---|---|
| JP | 2008-199806 A | 8/2008 |
| JP | 2008-236921 A | 10/2008 |
| JP | 2009-131006 A | 6/2009 |
| JP | 2009-261150 A | 11/2009 |

OTHER PUBLICATIONS

International Search Report of PCT/JP2010/059815 mailed Sep. 14, 2010.

\* cited by examiner

STATOR MANUFACTURING METHOD AND STATOR

CROSS-REFERENCE TO RELATED APPLICATIONS

This application is a continuation application based upon and claims the benefit of the prior PCT International Patent Application No. PCT/JP2010/059815 filed on Jun. 10, 2010, the entire contents of which are incorporated herein by reference.

TECHNICAL FIELD

The present invention relates to a stator manufacturing method for manufacturing a stator including divided-core assemblies arranged in a cylindrical shape, each of the divided-core assemblies including a divided-core member with a teeth on which a coil is wound.

BACKGROUND ART

In a stator manufacturing method, a plurality of divided-core members are assembled into a cylindrical shape to constitute a stator. Actually, divided-core assemblies each including a divided-core member with a teeth on which a coil is wound are arranged in a cylindrical shape to constitute a stator assembly, and coil end portions are resin-molded to complete a stator.

When the divided-core assemblies are to be arranged in a cylindrical shape to constitute the stator assembly, the outer periphery of the assemblies is restricted with a metal ring as disclosed in Patent Document 1.

However, this method needs a work to thermally expand the metal ring in order to fit the ring on the assemblies, resulting in an increased cost.

To solve this problem, for example, Patent Document 2 proposes the following technique. Firstly, divided-core assemblies are arranged in a cylindrical shape to form a stator assembly, the outer periphery of the stator assembly is restricted by an outer-periphery restricting jig, and then this stator assembly is subjected to resin molding to fill a plurality of slots formed between teeth. Thereafter, the outer-periphery restricting jig is removed and the outer periphery of the stator assembly is entirely resin-molded.

RELATED ART DOCUMENTS

Patent Documents

Patent Document 1: JP-A-2009-131006
Patent Document 2: JP-A-2009-261150

SUMMARY OF INVENTION

Problems to be Solved by the Invention

However, the manufacturing method in Patent Document 2 may cause the following problems.

Specifically, this method includes a step of resin-molding to fill the slots while the outer periphery of the stator assembly is restricted with the outer-periphery restricting jig, and a step of resin-molding the outer periphery of the stator assembly after removing the outer-periphery restricting jig. Thus, the resin molding steps result in a long manufacturing cycle, leading to cost increase.

In the case of using normal resin, a molding portion has to be thick to provide strength to the stator. This causes a problem with upsizing of the stator.

The present invention has been made to solve the above problems and has a purpose to provide a stator manufacturing method capable of manufacturing a stator having sufficient strength with a reduced time of a resin molding step without using a metal ring, and a stator.

Means of Solving the Problems

To achieve the above purpose, one aspect of the invention provides a stator manufacturing method and a stator configured as below.

(1) In a stator manufacturing method for manufacturing a stator in which divided-core assemblies are arranged in a cylindrical shape, each of the divided-core assemblies including a divided-core member having a teeth on which a coil is wound, the method includes: inserting the divided-core assemblies in the cylindrical shape in a fixed mold, and molding the cylindrically arranged divided-core assemblies by placing resin sheets containing glass fibers or carbon fibers on coil end portions of the divided-core assemblies and pressing the resin sheets with a movable mold to integrally combine the divided-core assemblies. Herein, the length of the glass fibers (carbon fibers) is set to be 10 mm or more. The volume ratio of the glass fibers (carbon fibers) is set to be 30% or more. The glass fibers (carbon fibers) have a diameter of several microns and for example random orientation.

(2) In the stator manufacturing method disclosed in (1), preferably, the resin sheets are subjected to pressing and molding after positioning the divided-core assemblies with the movable mold.

(3) In the stator manufacturing method disclosed in (1), preferably, the resin sheets are made of thermosetting resin, and the resin sheets are heated and hardened after the resin sheets are subjected to pressing and molding.

(4) In the stator manufacturing method disclosed in (1), preferably, the resin sheets are made of thermoplastic resin, and the resin sheets are heated and melted before the resin sheets are subjected to pressing and molding.

(5) In the stator manufacturing method disclosed in (1), preferably, when the resin sheets are placed on the coil end portions so that the glass fibers or carbon fibers contained in the resin sheets have different lengths according to molding positions of the coil end portions. In a portion needing to be strong, the length of the glass fibers (carbon fibers) is preferably set to be on the order of 30 mm to 50 mm or be longer than this range.

Effects of the Invention

The stator manufacturing method and the stator according to the present invention can provide the following operations and advantages.

(1) In the stator manufacturing method for manufacturing a stator in which divided-core assemblies are arranged in a cylindrical shape, each of the divided-core assemblies including a divided-core member having a teeth on which a coil is wound, the method includes: inserting the divided-core assemblies in the cylindrical shape in a fixed mold, and molding the cylindrically arranged divided-core assemblies by placing resin sheets containing glass fibers or carbon fibers on coil end portions of the divided-core assemblies and pressing the resin sheets with a movable mold to integrally combine the divided-core assemblies.

Accordingly, this method can provide high strength to the stator because of the glass fibers or carbon fibers contained in the resin, without using a metal ring. In particular, the strength of the resin covering the outer periphery side of each coil end portion is enhanced by the glass fibers (carbon fibers), so that the divided-core assemblies can sufficiently resist a force acting in a radial outward direction.

(2) In the stator manufacturing method disclosed in (1), the resin sheets are subjected to pressing and molding after positioning the divided-core assemblies with the movable mold. Accordingly, resin molding can be achieved without such an outer-periphery restricting jig as disclosed in Patent Document 2. Thus, the above method needs no work to attach or detach the outer-periphery restricting jig, so that the time for the molding step can be shortened. Since there is no need to prepare any special outer-periphery restricting jigs, a facility cost can be reduced.

(3) In the stator manufacturing method disclosed in (1), the resin sheets are made of thermosetting resin, and the resin sheets are heated and hardened after the resin sheets are subjected to pressing and molding. Accordingly, this method can make the resin closely flow in the coil end portions and between the teeth portions (in the slots) and between the coils without gaps.

(4) In the stator manufacturing method disclosed in (1), the resin sheets are made of thermoplastic resin, and the resin sheets are heated and melted before the resin sheets are subjected to pressing and molding. Accordingly, the method can make the resin closely flow in the coil end portions and between the teeth portions (in the slots) and between the coils without gaps.

(5) In the stator manufacturing method disclosed in one of (1), when the resin sheets are placed on the coil end portions so that the glass fibers or carbon fibers contained in the resin sheets have different lengths according to molding positions of the coil end portions. Thus, the resin sheet containing long glass fibers or carbon fibers has only to be applied to only a portion needing strength. Since such a resin sheet containing long glass fibers or carbon fibers is expensive, a resin sheet containing short glass fibers or carbon fibers may be applied to a portion not requiring strength, resulting in a decrease in material cost.

MODE FOR CARRYING OUT THE INVENTION

A detailed description of a preferred embodiment of a stator manufacturing method and a stator embodying the present invention will now be given referring to the accompanying drawings. This stator manufacturing method includes forming divided-core assemblies in each of which a coil is wound around a teeth of a divided-core member, arranging the divided-core assemblies in a cylindrical shape, and integrally molding the divided-core assemblies.

<First Embodiment>

Figure 1:
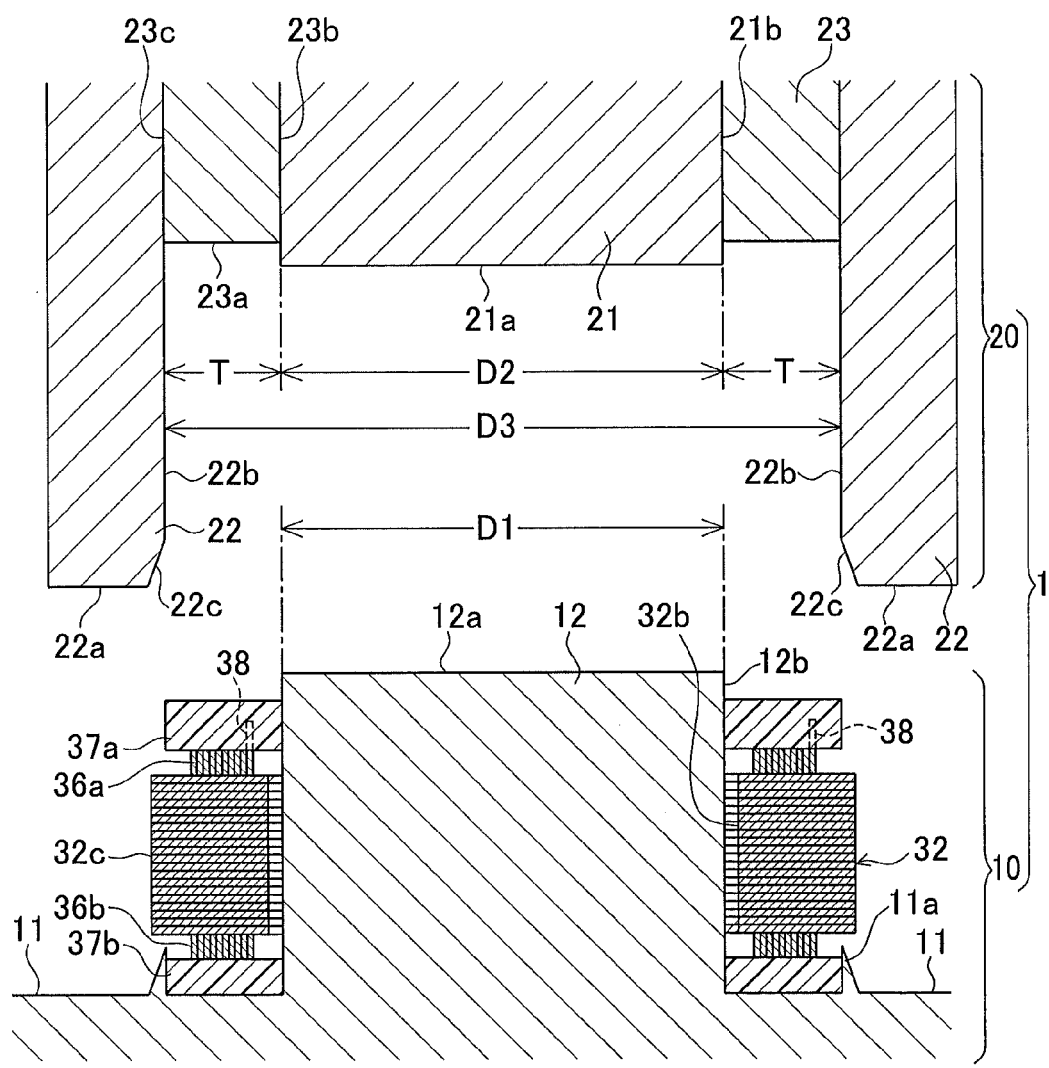
FIG. 1 is a cross sectional view of a stator manufacturing apparatus in a first embodiment.

A schematic configuration of a stator manufacturing apparatus used in the first embodiment will be explained first referring to FIG. 1. FIG. 1 is a cross sectional view of the stator manufacturing apparatus in the first embodiment.

A stator manufacturing apparatus 1 includes a fixed mold 10 fixed on an apparatus side and a movable mold 20 placed to be movable as shown in FIG. 1. These molds 10 and 20 of the apparatus 1 are each internally provided with an (electromagnetic induction) heating device and a cooling channel, which are not shown.

The fixed mold 10 includes a horizontal surface 11 formed to be horizontally flat and a columnar part 12 formed to protrude upward from the horizontal surface 11. This horizontal surface 11 is a support surface to support divided-core assemblies 32 from below.

The horizontal surface 11 is formed with a protrusion 11a protruding upward and extending along the outer periphery of the divided-core assemblies 32. The columnar part 12 is used to position the divided-core assemblies 32 in a cylindrical shape. This columnar part 12 has a columnar shape. The axis of the columnar part 12 extends in an up-and-down direction. The diameter D1 of the columnar part 12 is equal to the inner diameter of a stator to be manufactured. An outer peripheral surface 12b of the columnar part 12 is a contact surface that will contact with inner peripheral surfaces 32b of the divided-core assemblies 32.

The movable mold 20 is disposed above the fixed mold 10 and movable reciprocally in the up-and-down direction. This movable mold 20 includes a columnar part 21, a cylindrical part 22, and a slide part 23. The columnar part 21 has a columnar shape. The axis of the columnar part 21 is aligned with the axis of the columnar part 12 of the fixed mold 10. The diameter D2 of the columnar part 21 is equal to the diameter D1 of the columnar part 12 of the fixed mold 10. A lower surface 21a of the columnar part 21 is a contact surface that will contact with an upper surface 12a of the columnar part 12 of the fixed mold 10.

The cylindrical part 22 has a cylindrical shape. The axis of the cylindrical part 22 coincides with the axis of the columnar part 21. The inner diameter D3 of the cylindrical part 22 corresponds to the sum of the diameter D2 of the columnar part 21 and a double value of the thickness T of a stator in a radial direction. A lower surface 22a of the cylindrical part 22 is a contact surface that will contact with the horizontal surface 11 of the fixed mold 10. An inner peripheral surface 22b of the cylindrical part 22 is a contact surface that will contact with outer peripheral surfaces 32c of the divided-core assemblies 32. In this cylindrical part 22, a corner portion between the lower surface 22a and the inner peripheral surface 22b is chamfered in the entire circumference to form a slant surface 22c. This slant surface 22c is a contact surface that will contact with the protrusion 11a of the horizontal surface 11 of the fixed mold 10. The cylindrical part 22 is configured to move in the up-and-down direction together with the columnar part 21.

The slide part 23 is located between the columnar part 21 and the cylindrical part 22. This slide part 23 has a cylindrical shape. The axis of the slide part 23 coincides with the axes of the columnar part 21 and the cylindrical part 22. The inner diameter of the slide part 23 is equal to or slightly larger than the diameter D2 of the columnar part 21. The outer diameter of the slide part 23 is equal to or slightly smaller than the inner diameter D3 of the cylindrical part 22. Accordingly, the thickness of the slide part 23 in the radial direction is approximately equal to the radial thickness T of the stator to be manufactured. An inner peripheral surface 23b of the slide part 23 is a slide surface slidable with respect to the outer peripheral surface 21b of the columnar part 21. An outer peripheral surface 23c of the slide part 23 is a slide surface slidable with respect to the inner peripheral surface 22b of the cylindrical part 22. A lower surface 23a of the slide part 23 is a pressure surface to apply pressure resin sheets 37a and 37b.

<Stator>

Figure 2:
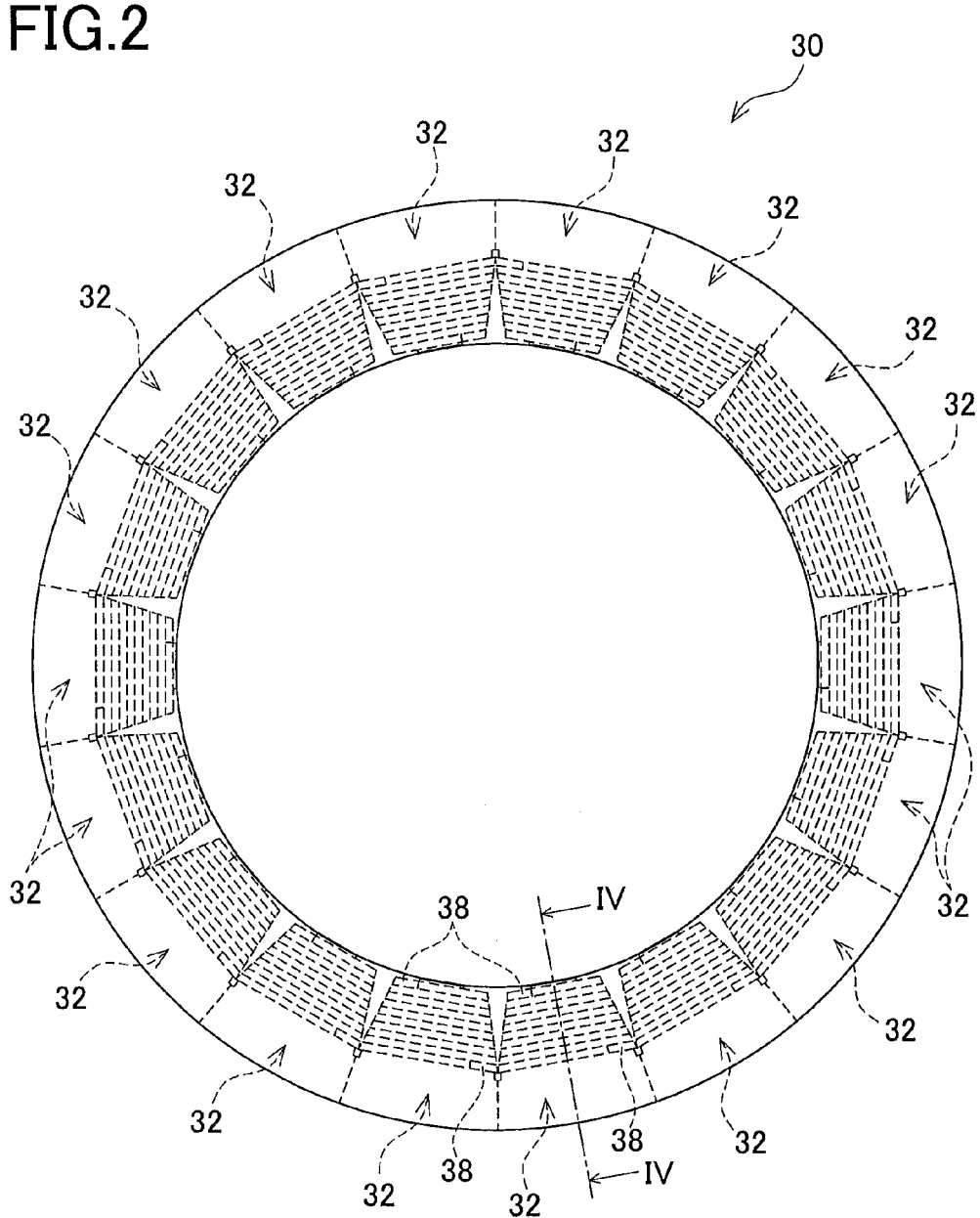
FIG. 2 is a top view of a stator in the first embodiment.
Figure 3:
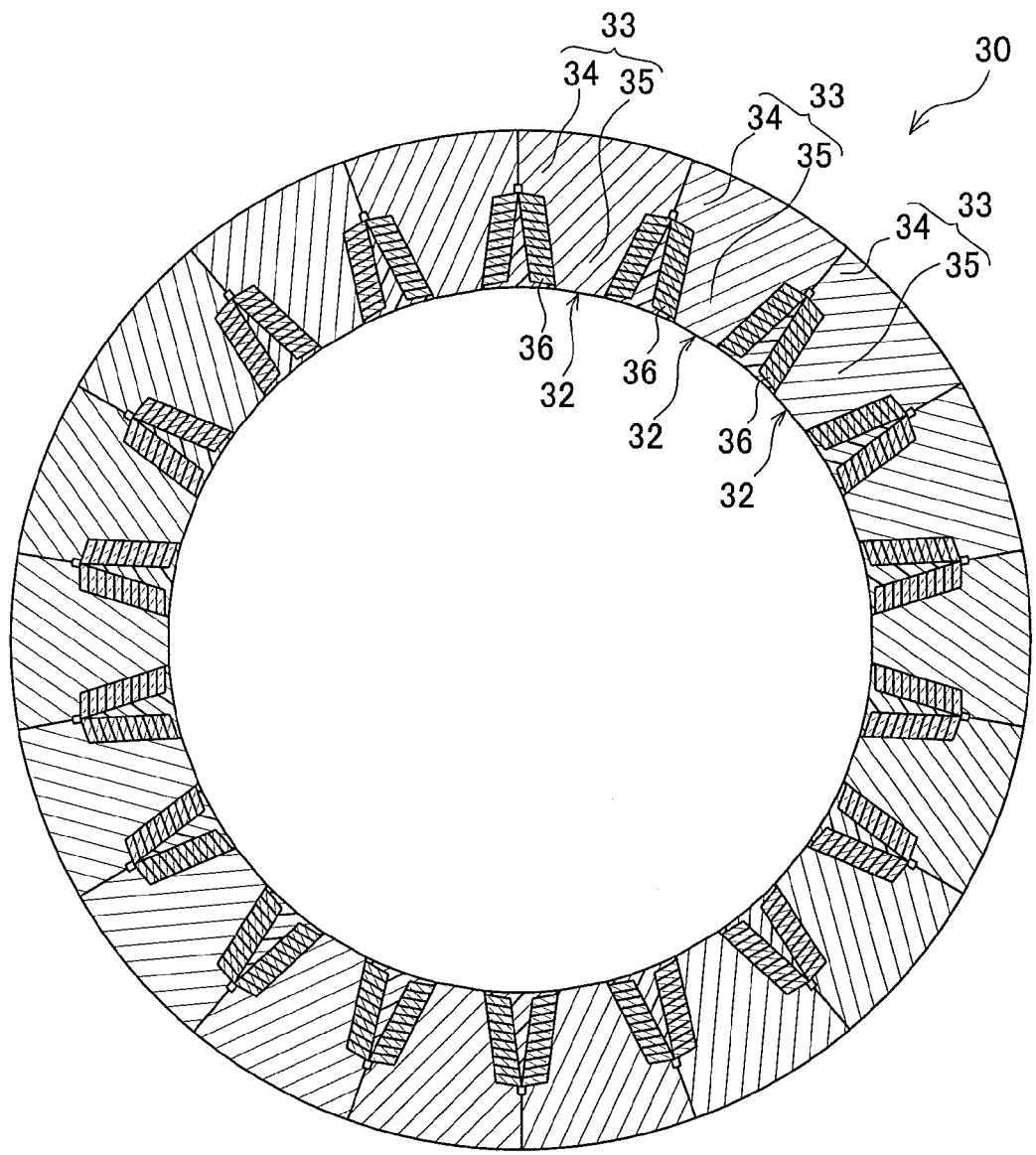
FIG. 3 is a horizontal cross sectional view of the stator of FIG. 2.
Figure 4:
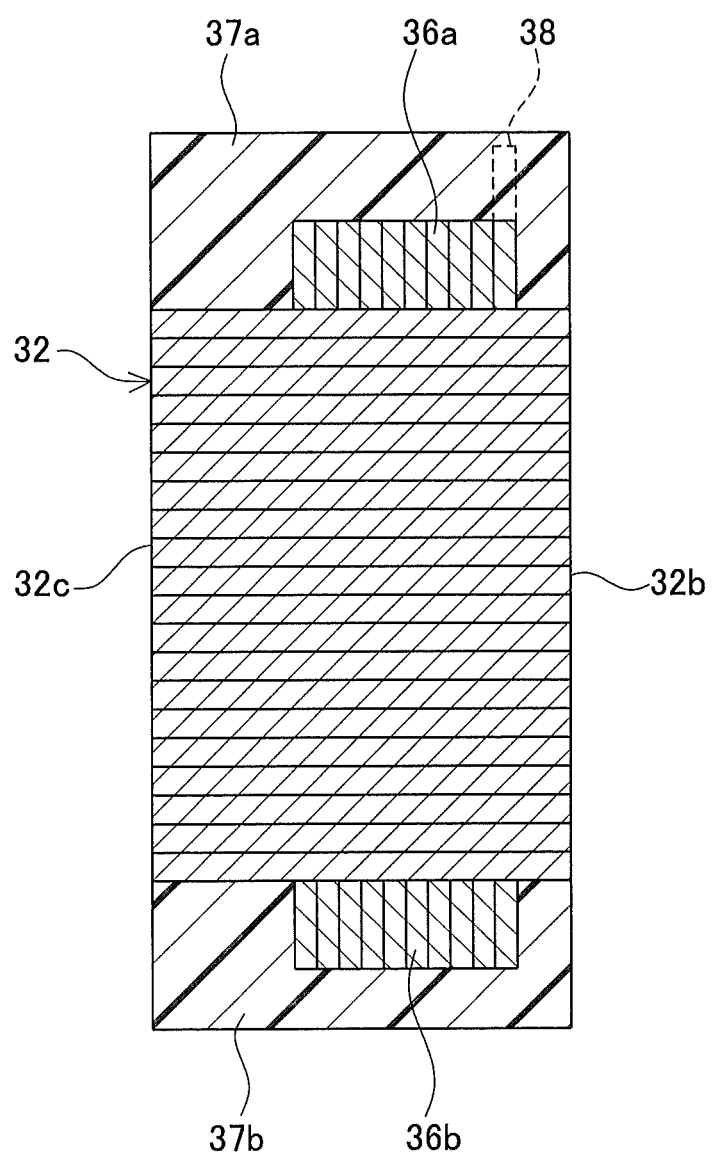
FIG. 4 is an enlarged cross sectional view of the stator taken along a line IV-IV in FIG. 2.

A stator 30 to be manufactured by the above stator manufacturing apparatus 1 will be explained below referring to FIGS. 2 to 4. FIG. 2 is a top view of a stator in the present embodiment. FIG. 3 is a horizontal cross sectional view of the stator of FIG. 2. FIG. 4 is an enlarged cross sectional view of the stator taken along a line IV-IV in FIG. 2.

The stator 30 consists of a plurality of the divided-core assemblies 32 each being formed in a separate form and assembled together in a cylindrical shape as shown in FIG. 2. In the present embodiment, the stator 30 is made up of eighteen divided-core assemblies 32.

A divided-core member 33 is made of a plurality of electromagnetic steel sheets laminated in layers by press or other techniques. This divided-core member 33 includes, as shown in FIG. 3, a yoke 34 forming an outer circumferential side and a teeth portion 35 protruding from the yoke 34 toward the axis. Each divided-core assembly 32 is configured such that a coil 36 is wound on the teeth portion 35. Further, the divided-core assemblies 32 are arranged in a cylindrical shape, constituting a stator assembly 31 (see FIG. 6). Coil end portions 36a and 36b on both upper and lower sides of each divided-core assembly 32 are molded respectively with the resin sheets 37a and 37b as shown in FIG. 4. The coil end portion 36a of each divided-core assembly 32 includes a terminal portion 38. This terminal portion 38 is connected to another terminal portion 38 of the same phase through a bus bar, even though the bas bar is not illustrated in each figure.

The resin sheets 37a and 37b of the present embodiment are resins used in SMC molding. The resin to make up the resin sheets 37a and 37b may be either thermosetting resin or thermoplastic resin. The present embodiment uses the thermosetting resin, e.g., unsaturated polyester. Any resin if only it is resistant to the heat generated during operation of a motor may be used to make up the resin sheets 37a and 37b. For example, the thermosetting resin may also be selected from epoxy resin, phenol resin, and others. On the other hand, the thermoplastic resin may be selected from PPS and others.

Furthermore, the resin sheets 37a and 37b of the present embodiment contain glass fibers or carbon fibers. The length of the glass fibers (carbon fibers) is set to be 10 mm or more. The volume ratio of the glass fibers (carbon fibers) is set to be 30% or more. The glass fibers (carbon fibers) has a diameter of several microns and has random orientation. The resin sheets 37a and 37b are each used in overlapping manner to provide a thickness needed for molding. The resin sheets 37a and 37b are each formed with recesses or grooves not shown in positions in which the terminal portions 38 of the coil end portions 36a and the bus bar(s) are to be molded.

<Stator Manufacturing Method>

Figure 5:
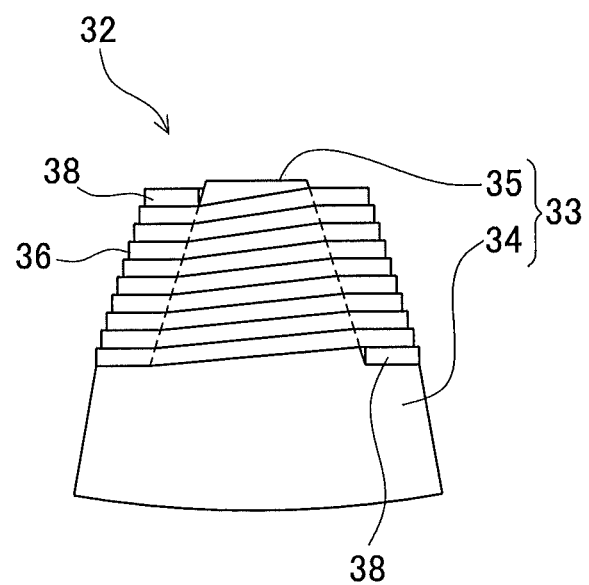
FIG. 5 is an explanatory view showing a winding step in a stator manufacturing method in the first embodiment.
Figure 6:
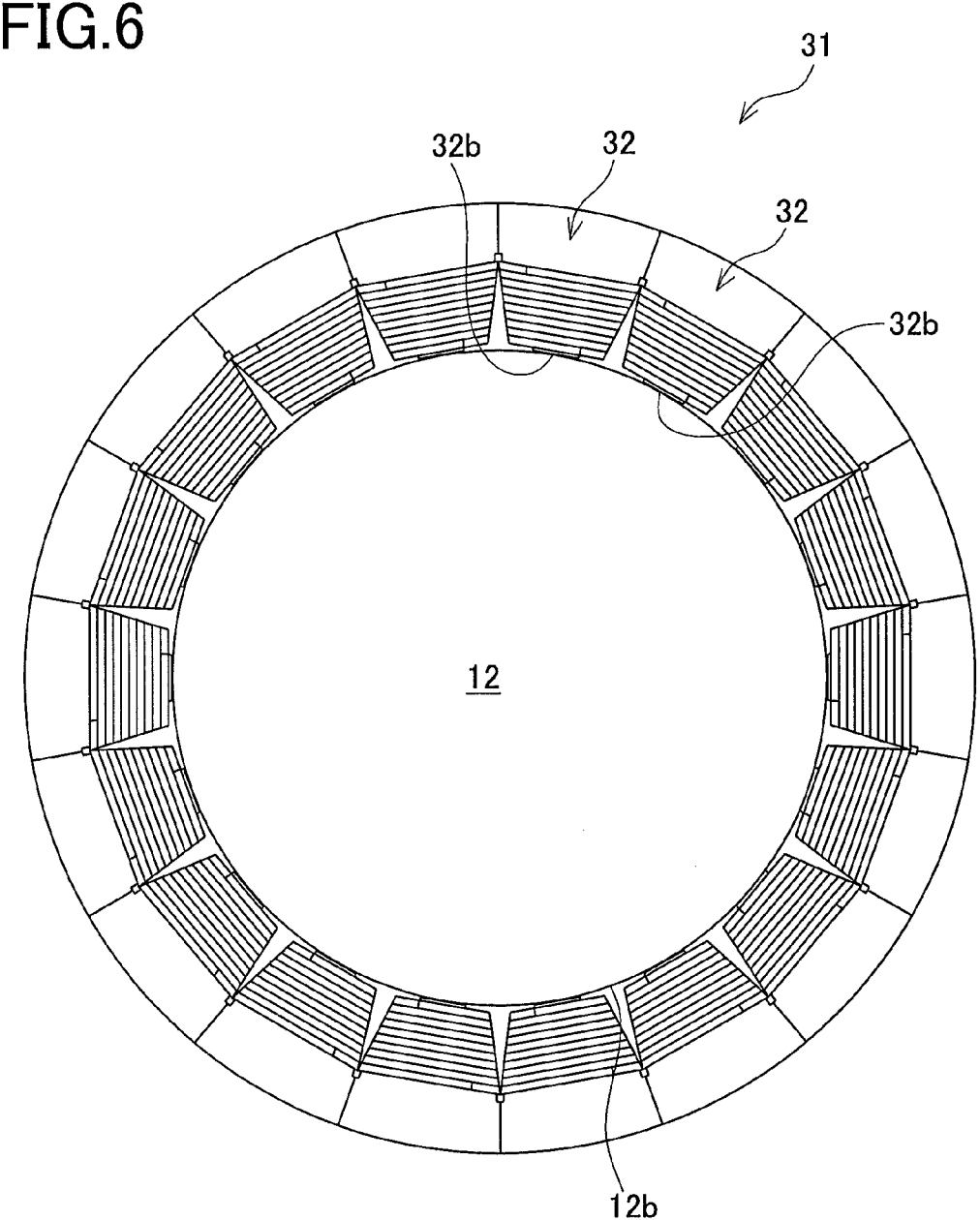
FIG. 6 is an explanatory view showing a arranging step in the same manufacturing method.
Figure 7:
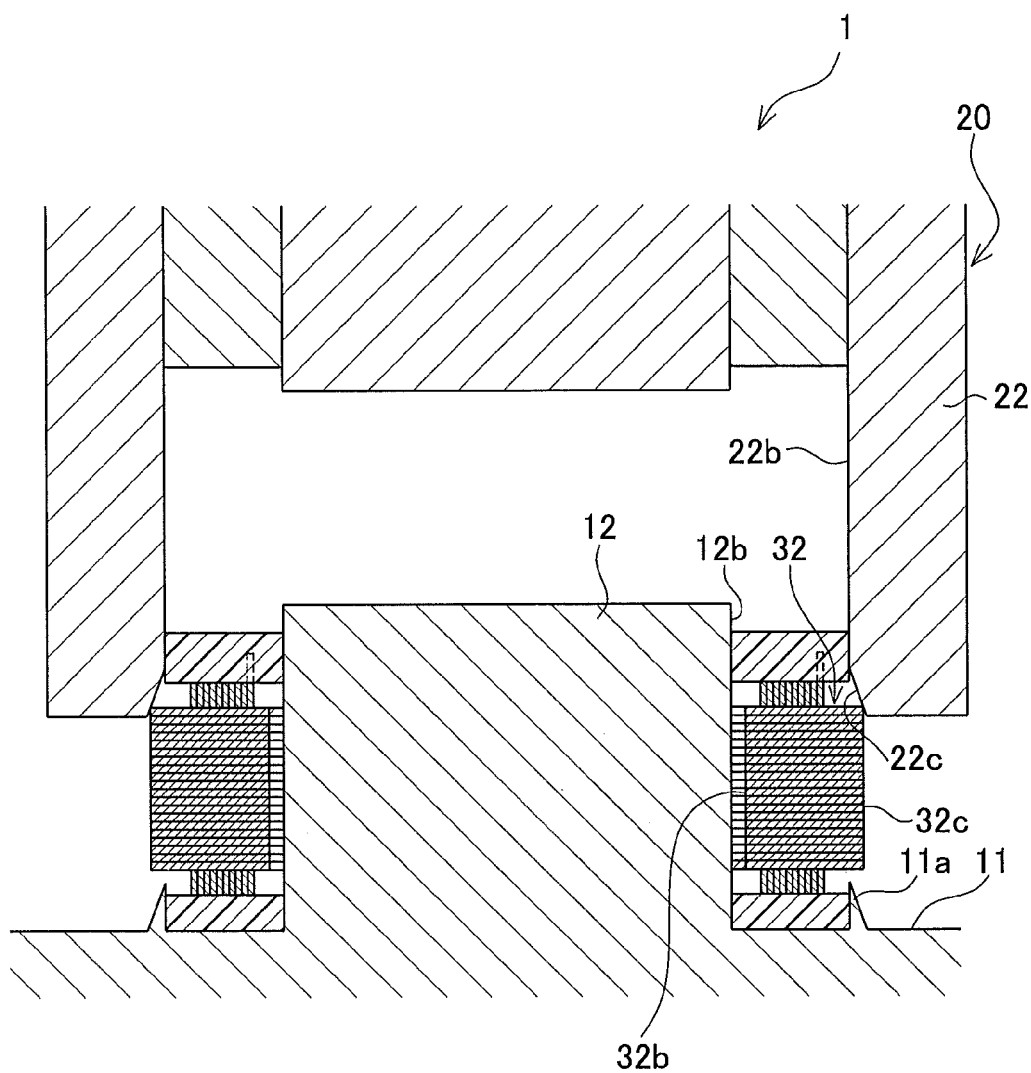
FIG. 7 is an explanatory view showing a positioning step in the same manufacturing method.
Figure 8:
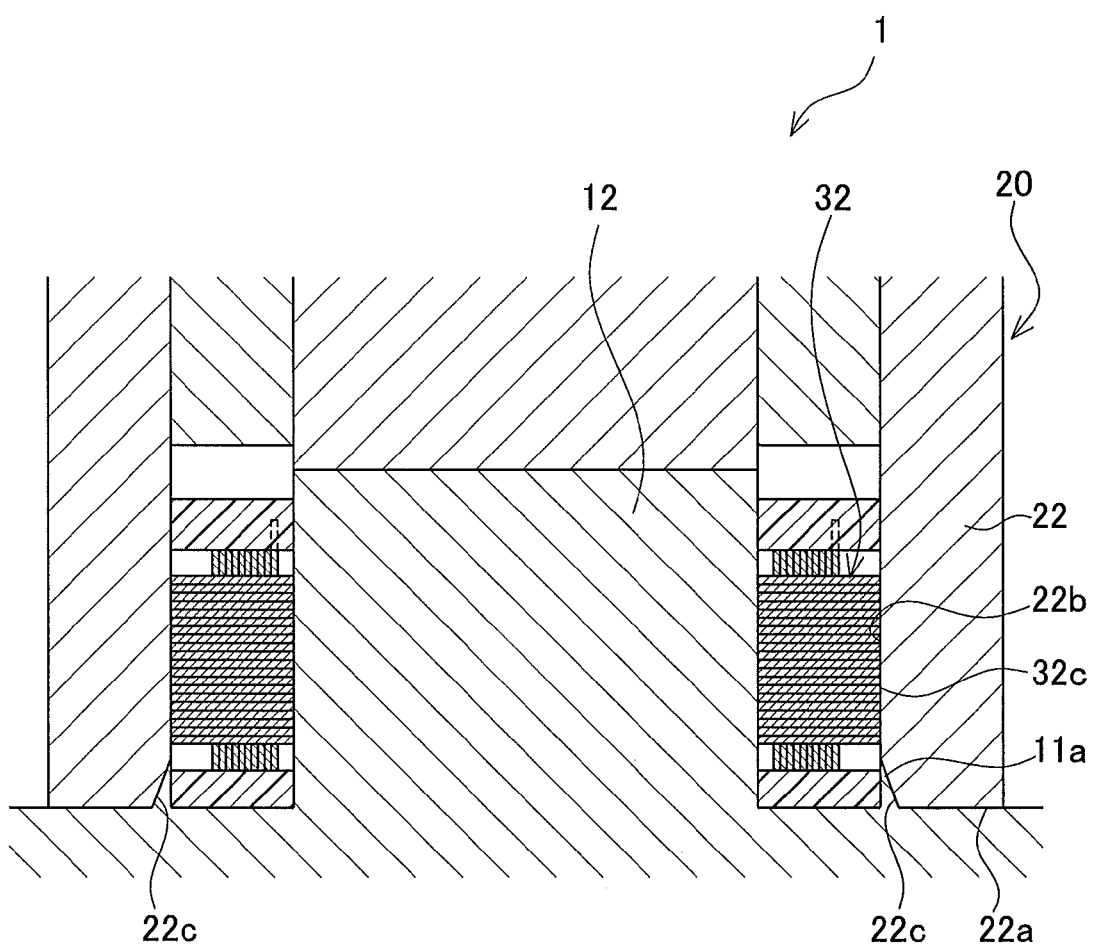
FIG. 8 is another explanatory view showing the positioning step in the same manufacturing method.
Figure 9:
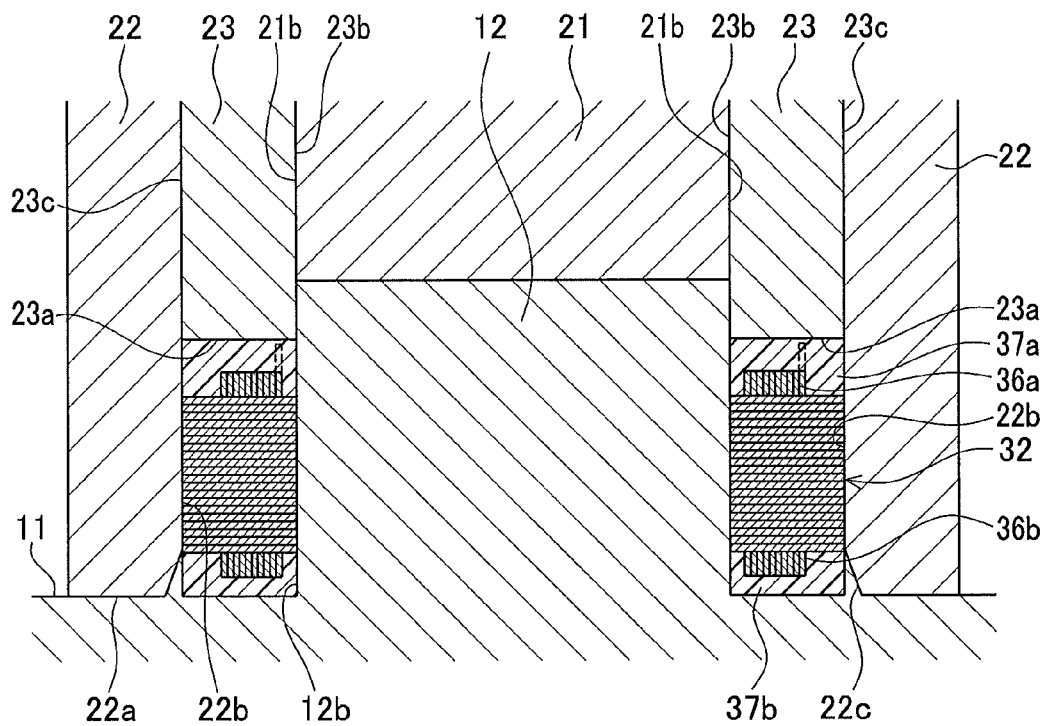
FIG. 9 is an explanatory view showing a molding step in the same manufacturing method.

The stator manufacturing method of the present embodiment will be explained below referring to FIGS. 5 to 9. In this stator manufacturing method, mainly, a winding step, an arranging step, a positioning step, and a molding step are performed in this order. FIG. 5 is an explanatory view showing the winding step in the stator manufacturing method of the present embodiment. FIG. 6 is an explanatory view showing the arranging step of the manufacturing method of the present embodiment. FIGS. 7 and 8 are explanatory views showing the positioning step of the manufacturing method of the present embodiment. FIG. 9 is an explanatory view showing the molding step of the manufacturing method of the present embodiment.

In the winding step, as shown in FIG. 5, the coil 36 is wound in a plurality of turns on the teeth portion 35 of each divided-core member 33. In this way, eighteen divided-core assemblies 32 are produced.

In the arranging step, the eighteen divided-core assemblies 32 are arranged in a cylindrical shape as shown in FIG. 6. In the present embodiment, when the divided-core assemblies 32 are arranged, the resin sheet 37a is placed on the upper coil end portions 36a while the resin sheet 37b is placed under the lower coil end portions 36d in advance as shown in FIG. 1. Then, the divided-core assemblies 32 are arranged in the cylindrical shape so that the inner peripheral surfaces 32b of the divided-core assemblies 32 contact with the outer peripheral surface 12b of the columnar part 12 of the fixed mold 10 as shown in FIG. 6. At that time, the divided-core assemblies 32 are supported from below on the horizontal surface 11 of the fixed mold 10 so that they are positioned at the same height. In this way, the stator assembly 31 is completed. Even though not shown, the fixed mold 10 is preferably provided with a protrusion or the like to determine the height of each divided-core assembly 32.

In the positioning step, as shown in FIGS. 7 and 8, the divided-core assemblies 32 arranged in the cylindrical shape are positioned in place. To be concrete, the movable mold 20 is moved downward so that the cylindrical part 22 covers the outer periphery of the divided-core assemblies 32. Specifically, the inner peripheral surface 22b of the cylindrical part 22 of the movable mold 20 is brought into contact with the outer peripheral surfaces 32c of the divided-core assemblies 32 to thereby determine the positions of the divided-core assemblies 32 in the radial direction. Herein, the cylindrical part 22 in the present embodiment is configured so that a corner between the lower surface 22a and the inner peripheral surface 22b is chamfered over the entire circumference to form the slant surface 22c. Therefore, as the cylindrical part 22 is moved downward, as shown in FIG. 7, the divided-core assemblies 32 are pressed by the slant surface 22c of the cylindrical part 22 and gradually moved axially. In this manner, the divided-core assemblies 32 are pressed against the columnar part 12 of the fixed mold 10 so that the adjacent divided-core assemblies 32 are made tightly contact with each other, constituting the stator assembly 31. Since the corner between the lower surface 22a and the inner peripheral surface 22b of the cylindrical part 22 is chamfered, the cylindrical part 22 being moved downward is less likely to get snagged on the divided-core assemblies 32. Therefore, while the inner peripheral surface 22b of the cylindrical part 22 is smoothly contacting with the outer peripheral surfaces 32c of the divided-core assemblies 32, the divided-core assemblies 32 can be positioned in place. In a state shown in FIG. 8, the divided-core assemblies 32 are held between the columnar part 12 of the fixed mold 10 and the cylindrical part 22 of the movable mold 20 and thus fixed against displacement in the radial direction.

In the molding step, the coil end portions 36a and 36b of the divided-core assemblies 32 are resin-molded by SMC molding as shown in FIG. 9. To be specific, the slide part 23 of the movable mold 20 is slid downward so that the lower surface 23a of the slide part 23 presses the resin sheets 37a and 37b. This causes resin to flow or enter in the coil end portions 36a and 36b and between the teeth portions 35 (in the slots) and between the coils without gaps. Then, with the (electromagnetic induction) heating devices built in the molds 10 and 20, the resin sheets 37a and 37b are heated and hardened. Thereafter, the movable mold 20 is moved upward and the stator 30 is taken out from the fixed mold 10. In this manner, the stator 30 is obtained. Further, the molds 10 and 20 are cooled through the cooling channels internally provided therein. As above, since rapid heating is performed by the (electromagnetic induction) heating devices built in the molds 10 and 20 and rapid cooling is conducted by the cooling channels built in the molds 10 and 20, the time needed for the molding step can be shortened.

In the space defined by the horizontal surface 11, the outer peripheral surface 12b of the columnar part 12, the inner peripheral surface 22b of the cylindrical part 22, and the lower surface 23a of the slide part 23, air is present. If this air remains in the resin after molding, the strength of the stator 30 may be deteriorated. According to the manufacturing apparatus 1 of the present embodiment, however, as the slide part 23 is moved downward, the air is caused to release through gaps between the lower surface 22a of the cylindrical part 22 and the horizontal surface 11, gaps between the inner peripheral surface 23b of the slide part 23 and the outer peripheral surface 21b of the columnar part 21, and gaps between the outer peripheral surface 23c of the slide part 23 and the inner peripheral surface 22b of the cylindrical part 22. This makes it possible to prevent the air from entering in molded resin.

In the case of using thermoplastic resin such as PPS as the thermoplastic resin, on the other hand, the (electromagnetic induction) heating devices built in the molds 10 and 20 rapidly heat the resin sheets 37a and 37b to above a melting point, bringing the resin into a melted state. In this state, the slide part 23 of the movable mold 20 is slid downward to make the lower surface 23a of the slide part 23 press against the resin sheets 37a and 37b. Accordingly, the resin is caused to closely flow in the coil end portions 36a and 36b and between the teeth portions 35 (in the slots) and between the coils without gaps.

Thereafter, through the cooling channels built in the molds 10 and 20, the resin is rapidly cooled and hardened. As above, rapid heating is performed by the (electromagnetic induction) heating devices built in the molds 10 and 20 and rapid cooling is conducted by the cooling channels built in the molds 10 and 20, so that the time needed for the molding step can be shortened. After the resin is hardened, the movable mold 20 is moved upward, and the stator 30 is taken out from the fixed mold 10. The stator 30 is thus obtained.

According to the stator manufacturing method of the present embodiment, as explained in detail above, to manufacture the stator 30 including the divided-core assemblies 32 arranged in the cylindrical shape, in each of which the coil 36 is wound on the teeth portion 35 of the divided-core member 33, the stator manufacturing method includes inserting the divided-core assemblies 32 in a cylindrical shape in the fixed mold 10, placing the resin sheets 37a and 37b each containing glass fibers or carbon fibers on the coil end portions 36a and 36b of the divided-core assemblies 32 arranged in the cylindrical shape, and pressing the resin sheets 37a and 37b with the slide part 23 of the movable mold 20 to perform molding to thereby integrally combine the divided-core assemblies 32. Accordingly, the strength of the stator 30 can be increased by the glass fibers or carbon fibers contained in the resin without using a metal ring.

Especially, since the strength of the resin covering the outer periphery side of the coil end portions 36a and 36b is enhanced by the glass fibers (carbon fibers), the divided-core assemblies 32 can sufficiently resist a force acting in the radial outward direction.

According to the stator manufacturing method of the present embodiment, in the case of using the resin sheets 37a and 37b made of thermosetting resin, after pressing and molding, the resin sheets 37a and 37b are heated and hardened. In the case of using the resin sheets 37a and 37b made of thermoplastic resin, before pressing, the resin sheets 37a and 37b are heated to a melting point or more and melted. Accordingly, the resin is caused to closely flow in the coil end portions 36a and 36b and between the teeth portion 35 (in the slots) and between the coils without gaps. At that time, rapid heating is performed by the (electromagnetic induction) heating devices built in the molds 10 and 20 and rapid cooling is conducted by the cooling channels built in the molds 10 and 20, so that the time needed for the molding step can be shortened. Accordingly, the heating devices and a cooling pump can reduce power consumption.

According to the stator manufacturing method of the present embodiment, the divided-core assemblies are positioned in place by the cylindrical part 22 of the movable mold 20 and then the resin sheets 37a and 37b are pressed and molded. Thus, resin molding can be achieved without using such an outer periphery restricting jig as disclosed in Patent Document 2. Since the molding step needs no work to attach or detach the outer periphery restricting jig, the time for the molding step can be shortened. Further, there is no need to prepare any special outer periphery restricting jig, so that a facility cost can be reduced.

Figure 10:
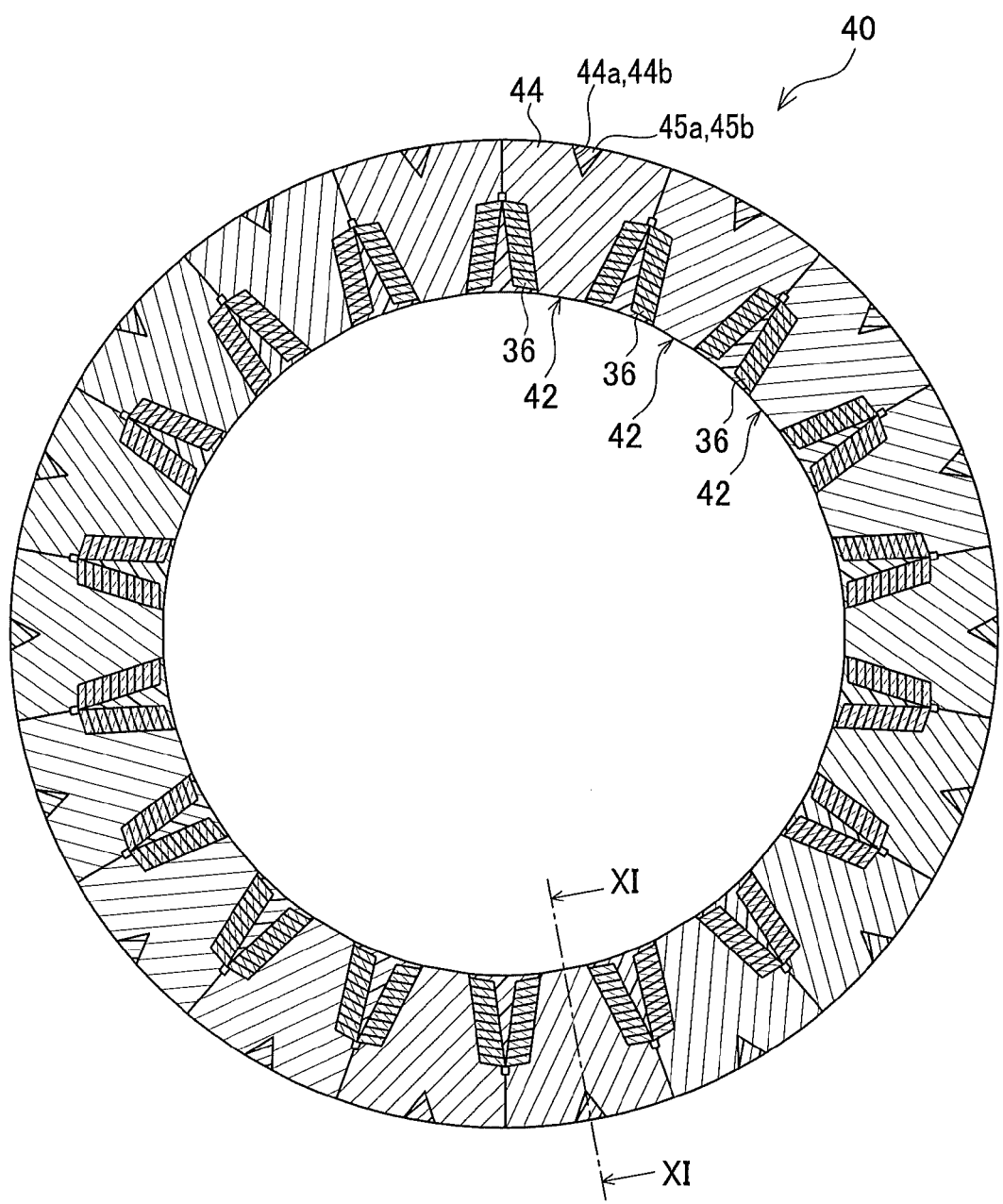
FIG. 10 is a horizontal cross sectional view of a first modified example of the stator.
Figure 11:
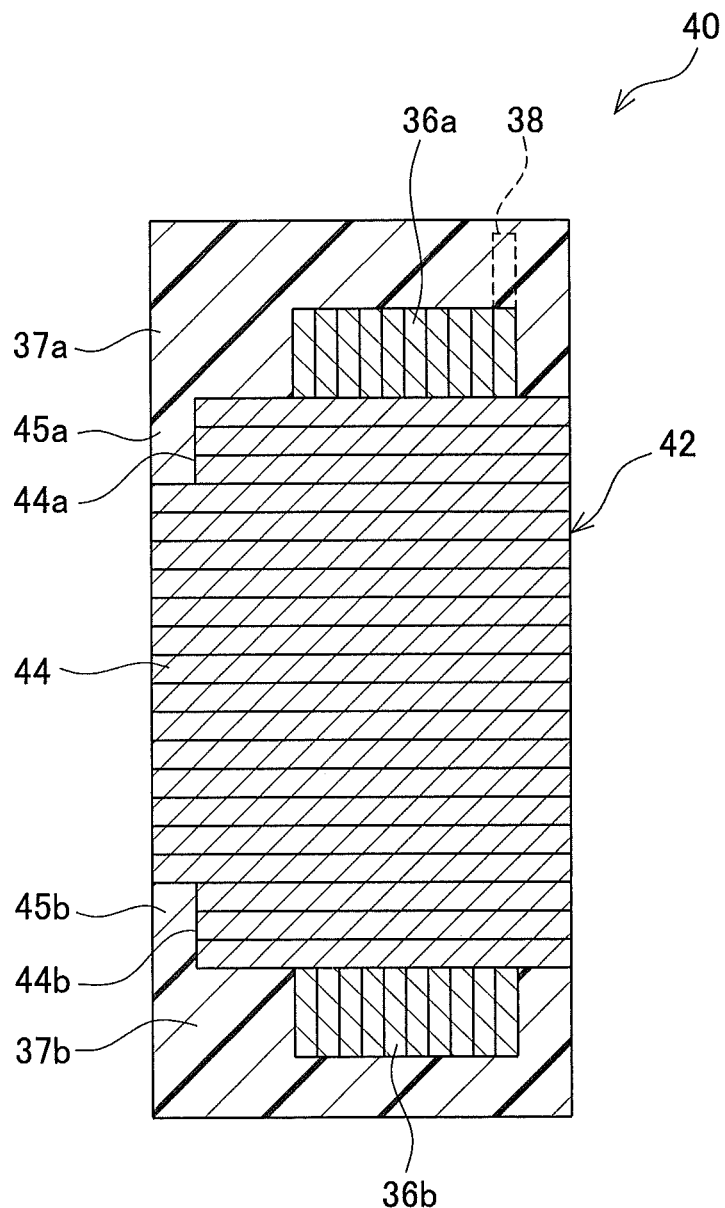
FIG. 11 is an enlarged cross sectional view of the stator in a line XI-XI in FIG. 10.
Figure 12:
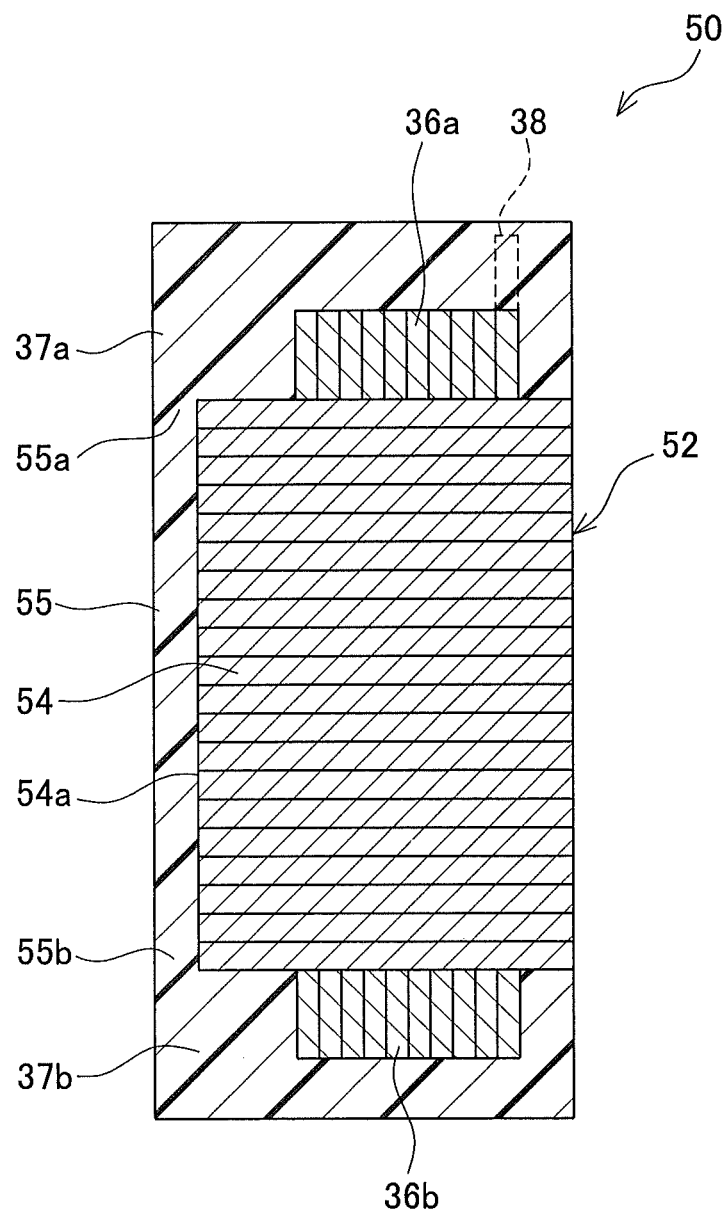
FIG. 12 is an enlarged cross sectional view of a second modified example of the stator.
Figure 13:
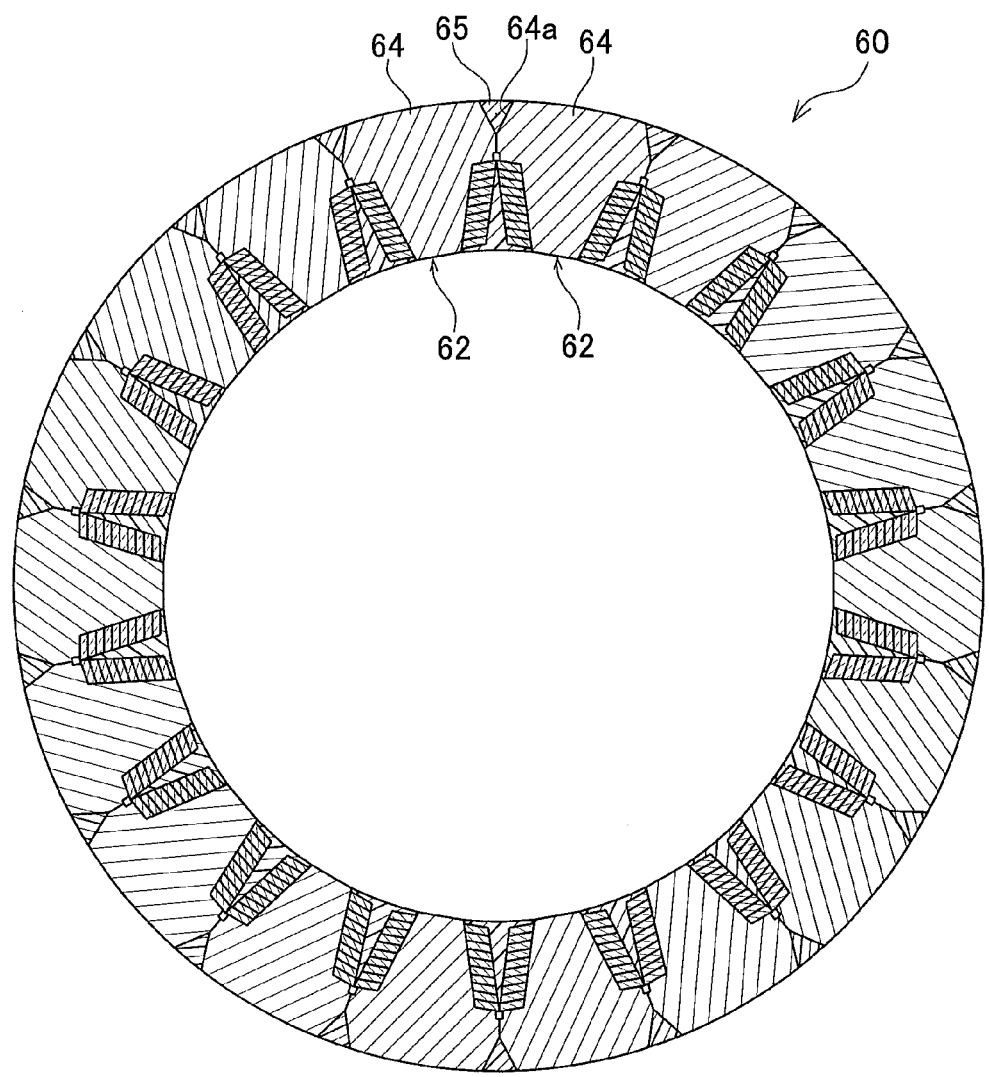
FIG. 13 is a horizontal cross sectional view of a third modified example of the stator.

Next, first to third modified examples of the stator of the present embodiment will be explained referring to FIGS. 10 to 13. FIG. 10 is a horizontal cross sectional view of the stator of the first modified example. FIG. 11 is an enlarged cross sectional view of the stator taken along a line XI-XI in FIG. 10. FIG. 12 is an enlarged cross sectional view of the stator of the second modified example. FIG. 13 is a horizontal cross sectional view of the stator of the third modified example. In the first to third modified examples, similar or identical parts to those in the above embodiment are given the same reference signs and their explanations are appropriately omitted.

First Modified Example

In a stator 40 of the first modified example, as shown in FIG. 10, grooves 44a and 44b each having a V-shaped cross section are formed to extend in an axial direction at the center of the outer periphery of a yoke 42 of each divided-core assembly 42. To be specific, the grooves 44a and 44b in the first modified example are the groove 44a formed on an upper end side of the yoke 44 in the axial direction and the groove 44b formed on a lower end side of the yoke 44 in the axial direction as shown in FIG. 11. These grooves 44a and 44b are molded with resin 45a and 45b that are the same material as the resin sheets 37a and 37b. The resin 45a molding or filling each groove 44a on the upper end side is integrally formed with the resin sheet 37a molding the upper coil end portions 36a. The resin 45b molding or filling each groove 44b on the lower end side is integrally formed with the resin sheet 37b molding the lower coil end portions 36b.

In the stator 40 of the first modified example, the resin 45a filling each groove 44a on the upper end side on the outer periphery of each yoke 44 and the resin sheet 37a molding the upper coil end portions 36a are integrally formed, while the resin 45b filling each groove 44b on the lower end side on the outer periphery of each yoke 44 and the resin sheet 37b molding the lower coil end portions 36b are integrally formed. Thus, the strength of the stator 40 on the outer periphery side can be enhanced.

Second Modified Example

In a stator 50 of the second modified example, as shown in FIG. 12, a groove 54a having a V-shaped cross section is formed to extend in an axial direction at the center of the outer periphery of a yoke 54 of each divided-core assembly 52. Especially, the groove 54a of the second modified example, different from that in the first modified example, is formed continuously from an upper end side to a lower end side of the yoke 54 in the axial direction. This groove 54a is molded or filled with resin 55 that is the same material as the resin sheets 37a and 37b. An upper end portion 55a of the resin 55 filling the groove 54a is integrally formed with the resin sheet 37a molding the upper coil end portion 36a. Furthermore, a lower end portion 55b of the resin 55 filling the groove 54a is integrally formed with the resin sheet 37b molding the lower coil end portion 36b.

In the stator 50 of the second modified example, the upper end portion 55a of the resin 55 filling the groove 54a formed on the outer periphery of the yoke 54 is formed integral with the resin sheet 37a molding the upper coil end portion 36a and the lower end portion 55b of the resin 55 filling the groove 54a formed on the outer periphery of the yoke 54 is formed integral with the resin sheet 37b molding the lower coil end portion 36b. Accordingly, the strength of the stator 50 on the outer periphery side can be enhanced. Especially, through the vertically continuous groove 54, the resin 55 is integral with the resin sheets 37a and 37b disposed on upper and lower sides. Thus, the stator 50 with higher strength on the outer periphery side than in the first modified example can be obtained.

Third Modified Example

In a stator 60 of the third modified example, as shown in FIG. 13, a groove 64a having a V-shaped cross section is formed to extend in an axial direction in a position between the outer peripheral surfaces of yokes 64 of adjacent divided-core assemblies 62. This groove 64a is molded or filled with resin 65 that is the same material as the resin sheets 37a and 37b. This groove 64a may also be formed on the upper end side and the lower end side in the axial direction in each yoke 64 as with the grooves 44a and 44b in the first modified example shown in FIG. 11 or formed to be continuous from the upper end to the lower end in the axial direction in each yoke 64 as with the grooves 54a in the second modified example shown in FIG. 12.

In the stator 60 of the third modified example, similar to the first and second modified examples, the strength of the stator 60 on the outer periphery side can be enhanced by the resin 65. Furthermore, since the contact positions of the yokes 64 on the outer periphery side between the adjacent divided-core assemblies 62 are molded or filled with the resin 65, positional displacement between the adjacent divided-core assemblies 62 can be avoided. This can further enhance the strength of the stator 60.

<Second Embodiment>

Figure 14:
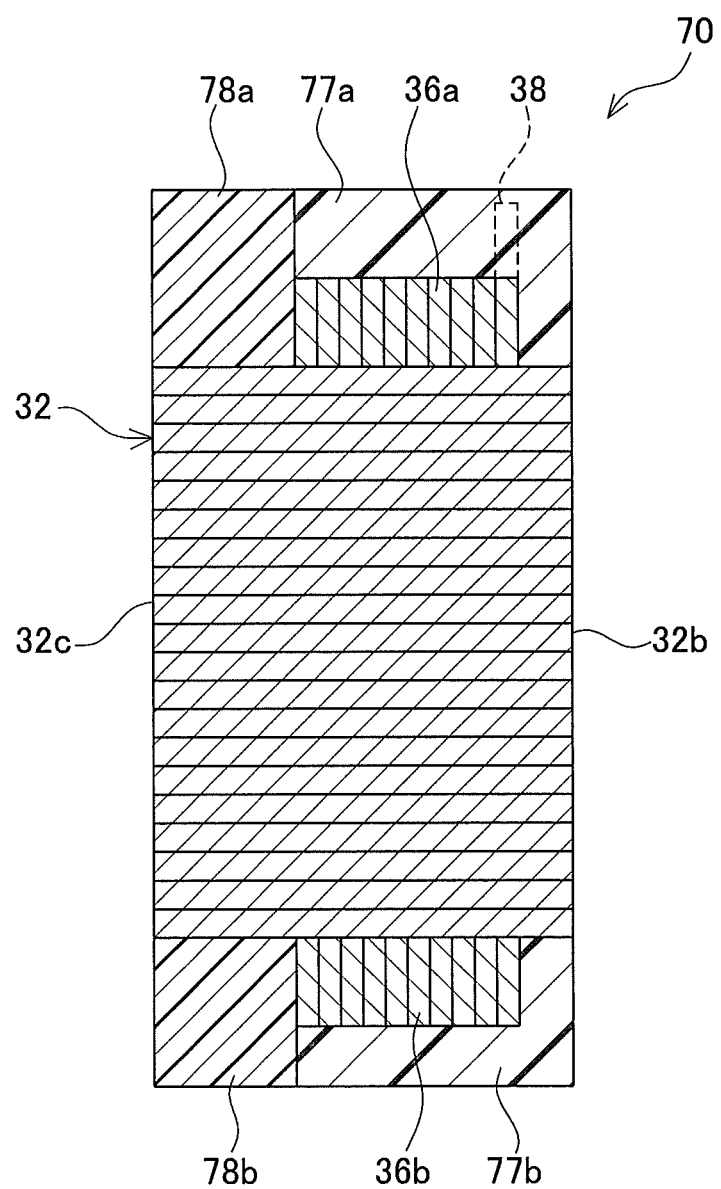
FIG. 14 is an enlarged cross sectional view of a stator in a second embodiment.

A stator 70 of a second embodiment of the present invention will be explained below referring to FIG. 14. FIG. 14 is an enlarged sectional view of the stator of the second embodiment. In the second embodiment, similar or identical parts to those in the first embodiment are given the same reference signs and their explanations are appropriately omitted. The following explanation is thus made with a focus on differences from the first embodiment.

Differently from the stator of the first embodiment, the stator 70 of the second embodiment is configured such that the glass fibers or carbon fibers contained in resin sheets have different lengths according to molding positions of the coil end portions 36a and 36b.

In the stator 70 of the present embodiment, the inner peripheral sides of the coil end portions 36a and 36b are molded respectively with resin sheets 77a and 77b as shown in FIG. 14. On the other hand, the outer peripheral sides of the coil end portions 36a and 36b are molded respectively with resin sheets 78a and 78b. The resin to make up the resin sheets 77a, 77b, 78a, and 78b may be either thermosetting resin or thermoplastic resin. The present embodiment also uses the thermosetting resin, e.g., unsaturated polyester. Any resin if only it is resistant to the heat generated during operation of a motor may be used to make up the resin sheets 77a, 77b, 78a, and 78b. For example, the thermosetting resin may also be selected from epoxy resin, phenol resin, and others. On the other hand, the thermoplastic resin may be selected from PPS and others. The resin sheets 77a and 77b placed on the inner periphery side contain glass fibers (carbon fibers) having a length of about 10 mm to 50 mm. On the other hand, the resin sheets 78a and 78b placed on the outer periphery side contain glass fibers (carbon fibers) having a length of at least about 30 mm to 50 mm or a length longer than this range. The volume ratio of the glass fibers (carbon fibers) in each of the resin sheets 77a, 77b, 78a, and 78b is 30% or more. The glass fibers (carbon fibers) used in this embodiment also has a diameter of several microns and has random orientation.

Figure 15:
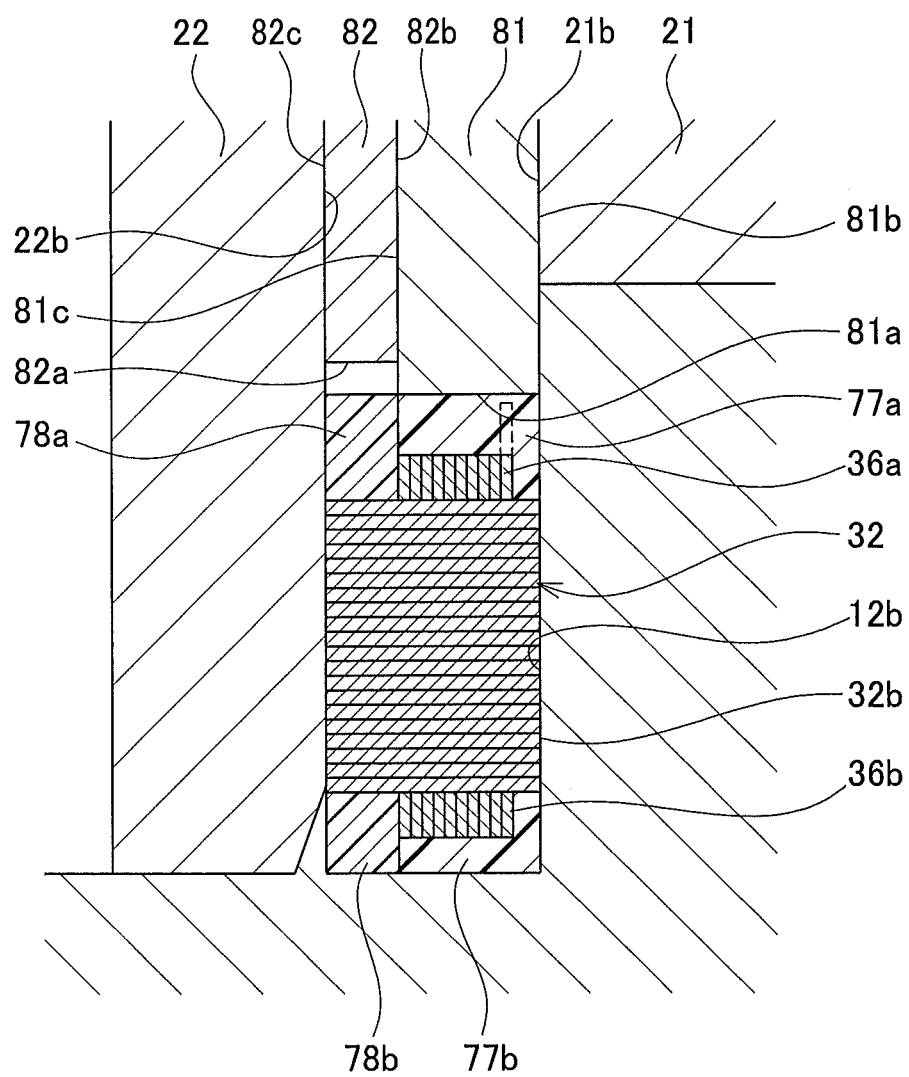
FIG. 15 is an explanatory view showing a molding step in a stator manufacturing method in the second embodiment.

A stator manufacturing apparatus and a manufacturing method used therein in the second embodiment will be explained below referring to FIG. 15. FIG. 15 is an explanatory view showing a molding step in the stator manufacturing method of the second embodiment.

The stator manufacturing apparatus of the present embodiment includes, as shown in FIG. 15, a first slide part 81 for molding the inner periphery side of the coil end portions 36a and 36b and a second slide part 82 for molding the outer periphery side of the coil end portions 36a and 36b, instead of the slide part 23 in the first embodiment.

The first slide part 81 is located on the inner periphery side between the columnar part 21 and the cylindrical part 22. The second slide part 82 is located on the outer periphery side between the columnar part 21 and cylindrical part 22. Each of the first slide part 81 and the slide part 82 has a cylindrical shape. The axis of each of the first slide part 81 and the slide part 82 coincides with the axis of the columnar part 21 and the cylindrical part 22. The inner diameter of the first slide part 81 is determined to be equal to or slightly larger than the diameter D2 of the columnar part 21 (see FIG. 2). The outer diameter of the second slide part 82 is determined to be equal to or slightly smaller than the diameter D3 of the cylindrical part 22 (see FIG. 2). An outer peripheral surface 81c of the first slide part 81 and an inner peripheral surface 82b of the second slide part 82 are sliding surfaces slidable to each other. Thus, the sum of the thickness of the first slide part 81 in the radial direction and the thickness of the second slide part 82 in the radial direction is equal to the radial thickness T of a stator to be manufactured. Furthermore, an inner peripheral surface 81b of the first slide part 81 and an outer peripheral surface 21b of the columnar part 21 are sliding surfaces slidable to each other. An outer peripheral surface 82c of the second slide part 82 and the inner peripheral surface 22b of the cylindrical part 22 are sliding surfaces slidable to each other. A lower surface 81a of the first slide part 81 is a pressure surface to press the resin sheets 77a and 77b. A lower surface 82a of the second slide part 82 is a pressure surface to press the resin sheets 78a and 78b.

In the stator manufacturing method of the present embodiment, the winding step, the arranging step, the positioning step, and the molding step are also performed in this order. The winding step and the positioning step in this stator manufacturing method are similar to those in the first embodiment and thus the following explanation is given with a focus on the arranging step and the molding step.

In the arranging step, similar to the first embodiment, the divided-core assemblies 32 are arranged in a cylindrical shape along the outer peripheral surface 12b of the columnar part 12 of the fixed mold 10. In the present embodiment, at that time, the resin sheets 77a and 77b are placed respectively on the inner periphery side of the coil end portions 36a and 36b and the resin sheets 78a and 78b are placed respectively on the outer periphery side of the coil end portions 36a and 36b.

In the molding step, the inner periphery side of the coil end portions 36a and 36b is first molded with the resin sheets 77a and 77b, and then the outer periphery side of the coil end portions 36a and 36b is molded with the resin sheets 78a and 78b. To be specific, the first slide part 81 is first slid downward. Thus, the lower surface 81a of the first slide part 81 presses the resin sheets 77a and 77b, deforming the resin sheets 77a and 77b, thus molding the inner periphery side of the coil end portions 36a and 36b on both upper and lower sides of each divided-core assembly 32. Thereafter, the second slide part 82 is slid downward. Accordingly, the lower surface 82a of the second slide part 82 presses the resin sheets 78a and 78b, deforming the resin sheets 78a and 78b, thus molding the outer periphery side of the coil end portions 36a and 36b on both upper and lower sides of each divided-core assembly 32. In this manner, the resin is caused to closely flow in the coil end portions 36a and 36b and between the teeth portions 35 (in the slots) and between the coils without gaps. Then, with the (electromagnetic induction) heating devices built in the molds 10 and 20, the resin sheets 77a, 77ab, 78a, and 78b are heated and hardened. Thereafter, the movable mold 20 is moved upward and the stator 70 is taken out from the fixed mold 10. In this manner, the stator 70 is obtained. The molds 10 and 20 are then cooled through the cooling channels built therein. As above, since rapid heating is performed by the (electromagnetic induction) heating devices built in the molds 10 and 20 and rapid cooling is conducted by the cooling channels built in the molds 10 and 20, the time needed for the molding step can be shortened.

In the case of using thermoplastic resin such as PPS as the thermoplastic resin, on the other hand, the (electromagnetic induction) heating devices built in the molds 10 and 20 rapidly heat the resin sheets 77a, 77b, 78a, and 78b to above a melting point, bringing the resin into a melted state. In this state, the first slide part 81 is slid downward. The lower surface 81a of the first slide part 81 thus presses and deforms the resin sheets 77a and 77b, thereby molding the inner periphery side of the coil end portions 36a and 36b on both upper and lower sides of the divided-core assemblies 32. Then, the second slide part 82 is slid downward. The lower surface 82a of the second slide part 82 thus presses and deforms the resin sheets 78a and 78b, thereby molding the outer periphery side of the coil end portions 36a and 36b on both upper and lower sides of the divided-core assemblies 32.

Thereafter, through the cooling channels built in the molds 10 and 20, the resin is rapidly cooled and hardened. After the resin is hardened, the movable mold 20 is moved upward and the stator 70 is taken out from the fixed mold 10. The stator 70 is thus obtained.

According to the stator manufacturing method of the present embodiment, when the resin sheets 77a, 77b, 78a, and 78b are to be disposed on the coil end portions 36a and 36b, the resin sheet s78a and 78b containing long glass fibers or carbon fibers are placed respectively on the outer periphery side of the coil end portions 36a and 36b. This can enhance the strength of the outer periphery side particularly needing strength. A resin sheet containing long glass fibers or carbon fibers is expensive. In the present embodiment, therefore, the resin sheets 77a and 77b containing relatively short glass fibers or carbon fibers are placed on the inner periphery side to reduce a material cost.

Figure 16:
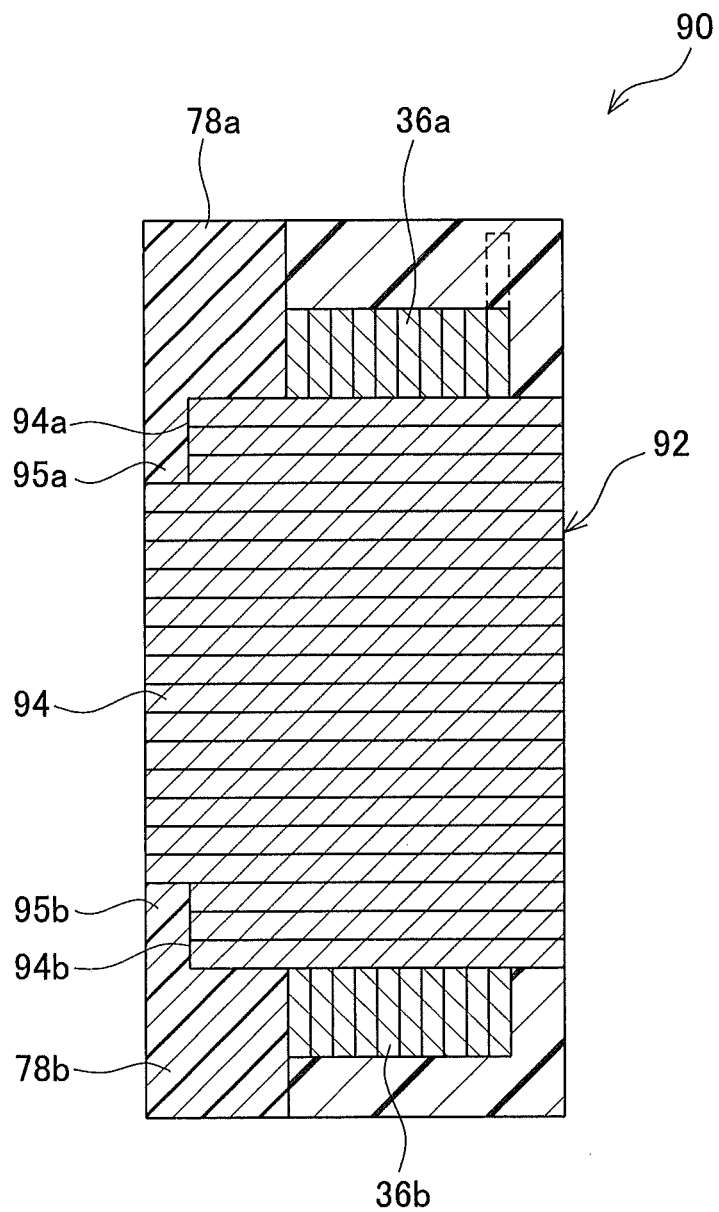
FIG. 16 is an enlarged cross sectional view of a fourth modified example of the stator.
Figure 17:
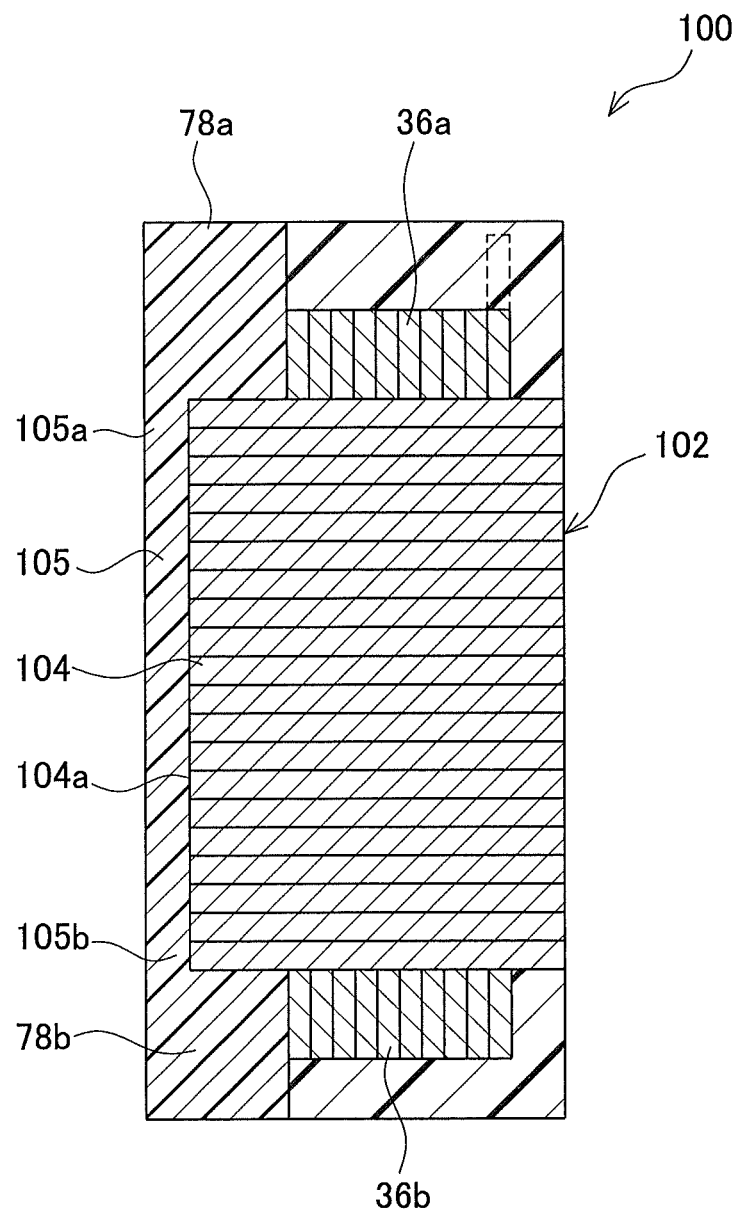
FIG. 17 is an enlarged cross sectional view of a fifth modified example of the stator.

Fourth and fifth modified examples of the second embodiment will be explained below referring to FIGS. 16 and 17. FIG. 16 is an enlarged sectional view of a stator of the fourth modified example. FIG. 17 is an enlarged sectional view of a stator of the fifth modified example. In the fourth and fifth modified examples, similar or identical parts to those of the above embodiments are given the same reference signs and their explanations are appropriately omitted.

Fourth Modified Example

In a stator 90 of the fourth modified example, grooves 94a and 94b each having a V-shaped cross section are formed to extend in an axial direction at the center of the outer periphery of a yoke 94 of each divided-core assembly 92, as shown in FIG. 16. To be specific, the grooves 94a and 94b consist of a groove 94a formed on un upper end side of each yoke 94 in the axial direction and a groove 94b formed on a lower end side of each yoke 94 in the axial direction. These grooves 94a and 94b are molded or filled with the resin 95a and 95b respectively. The resin 95a and the resin 95b contain glass fibers (carbon fibers) having a length of at least about 30 mm to 50 mm or a length longer than this range, as with the resin sheets 78a and 78b. The volume ratio of glass fibers (carbon fibers) in each resin 95a and 95b is 30% or more. The glass fibers (carbon fibers) has a diameter of several microns and has random orientation. The resin 95a filling the groove 94a on the upper end side is formed integral with the resin sheet 78a molding the upper coil end portion 36a. The resin 95b filling the groove 94b on the lower end side is formed integral with the resin sheet 78b molding the lower coil end portion 36b.

In the stator 90 of the fourth modified example, the resin 95a filling the groove 94a on the upper end side of the yoke 94 and the resin sheet 78a molding the upper coil end portion 36a are formed integrally, while the resin 95b filling the groove 94b on the lower end side of the yoke 94 and the resin sheet 78b molding the lower coil end portion 36b are formed integrally, so that the strength of the stator 90 on the outer periphery side can be enhanced. In the fourth modified example, especially, each resin 95a and 95b contains long glass fibers (carbon fibers) and hence the strength of the stator 90 can be further enhanced.

Also in the fourth modified example, the outer-periphery-side contact surfaces of the yokes 94 of the adjacent divided-core assemblies 92 may be molded with the resin 95a and 95b. This can prevent positional displacement between the adjacent divided-core assemblies 92.

Fifth Modified Example

In a stator 100 of the fifth modified example, as shown in FIG. 17, a groove 104a having a V-shaped cross section is formed to extend in an axial direction at the center on the outer periphery of a yoke 104 of each divided-core assembly 102. Especially, the groove 104a of the fifth modified example is, differently from that of the fourth modified example, formed to continuously extend from an upper end to a lower end of the yoke 104 in the axial direction. This groove 104a is molded or filled with resin 105. The resin 105 contains glass fibers (carbon fibers) having a length of at least about 30 mm to 50 mm or a length longer than this range as with the resin sheets 78a and 78b. The volume ratio of the glass fibers (carbon fibers) in the resin 105 is 30% or more. The glass fibers (carbon fibers) has a diameter of several microns and is oriented in a height direction. An upper end portion 105a of the resin 105 filling the groove 104a is formed integral with the resin sheet 78a molding the upper coil end portion 36a. A lower end portion 105b of the resin 105 filling the groove 104a is formed integral with the resin sheet 78b molding the lower coil end portion 36b.

In the stator 100 of the fifth modified example, the upper end portion 105a of the resin 105 filling the groove 104a formed on the outer periphery side of the yoke 104 and the resin sheet 78a molding the upper coil end portion 36a are formed integrally, while the lower end portion 105b of the resin 105 filling the groove 104a formed on the outer periphery side of the yoke 104 and the resin sheet 78b molding the lower end coil end portion 36b are formed integrally, so that the strength of the stator 100 on the outer periphery side can be enhanced. Further, the resin 105 is integrally formed with the resin sheets 78a and 78b located on both upper and lower sides through the vertically continuous groove 104a, this configuration can provide higher strength than in the fourth modified example. In the stator 100, moreover, the glass fibers (carbon fibers) contained in the resin 105 is oriented in the height direction, so that tensile stress that acts on each divided-core assembly 102 can be increased. The length of the glass fibers (carbon fibers) is preferably set to be longer than the height of the stator 100 in the axial direction.

Also, in the fifth modified example, the outer-periphery-side contact surfaces of the yokes 104 of the adjacent divided-core assemblies 102 may be molded with the resin 105. This can prevent positional displacement between the adjacent divided-core assemblies 102.

The above embodiments and modified examples are mere examples and do not particularly limit the invention. Thus, the present invention may be embodied in other specific forms without departing from the essential characteristics thereof.

For instance, the above embodiments exhibit the case where the slide part 23, 81, or 82 the movable mold 20 is slid with respect to the columnar part 21 and the cylindrical part 22 to perform pressing and molding. As an alternative, a movable mold integrally including a columnar part, a cylindrical part, and a slide part may be used to position divided-core assemblies and simultaneously press and mold them in a single process.

REFERENCE SIGNS LIST

1 Stator manufacturing apparatus
10 Fixed mold
20 Movable mold
22 Cylindrical part
23 Slide part
30 Stator
32 Divided-core assembly
32b Inner peripheral surface
32c Outer peripheral surface
33 Divided-core member
34 Yoke
35 Teeth
36 Coil
36a, 36b Coil end portion
37a, 37b Resin sheet
70 Stator
74 Yoke
77a Resin sheet
77b Resin sheet
78a Resin sheet
78b Resin sheet
81 First slide part
82 Second slide part

What is claimed is:

1. A stator manufacturing method for manufacturing a stator in which divided-core assemblies are arranged in a cylindrical shape, each of the divided-core assemblies including a divided-core member having a teeth on which a coil is wound, the method including:
   inserting the divided-core assemblies in the cylindrical shape in a fixed mold, and
   molding the cylindrically arranged divided-core assemblies by placing resin sheets containing glass fibers or carbon fibers on coil end portions of the divided-core assemblies and pressing the resin sheets with a movable mold to integrally combine the divided-core assemblies.

2. The stator manufacturing method according to claim 1, wherein the resin sheets are subjected to pressing and molding after positioning the divided-core assemblies with the movable mold.

3. The stator manufacturing method according to claim 1,
   wherein the resin sheets are made of thermosetting resin, and
   the resin sheets are heated and hardened after the resin sheets are subjected to pressing and molding.

4. The stator manufacturing method according to claim 1,
   wherein the resin sheets are made of thermoplastic resin, and
   the resin sheets are heated and melted before the resin sheets are subjected to pressing and molding.

5. The stator manufacturing method according to claim 1, wherein when the resin sheets are placed on the coil end portions so that the glass fibers or carbon fiber contained in the resin sheets have different lengths according to molding positions of the coil end portions.

* * * * *